Sept. 6, 1966  F. W. R. STARP  3,270,649
PHOTOGRAPHIC SELF-COCKING SHUTTER
Filed July 12, 1963  2 Sheets-Sheet 1
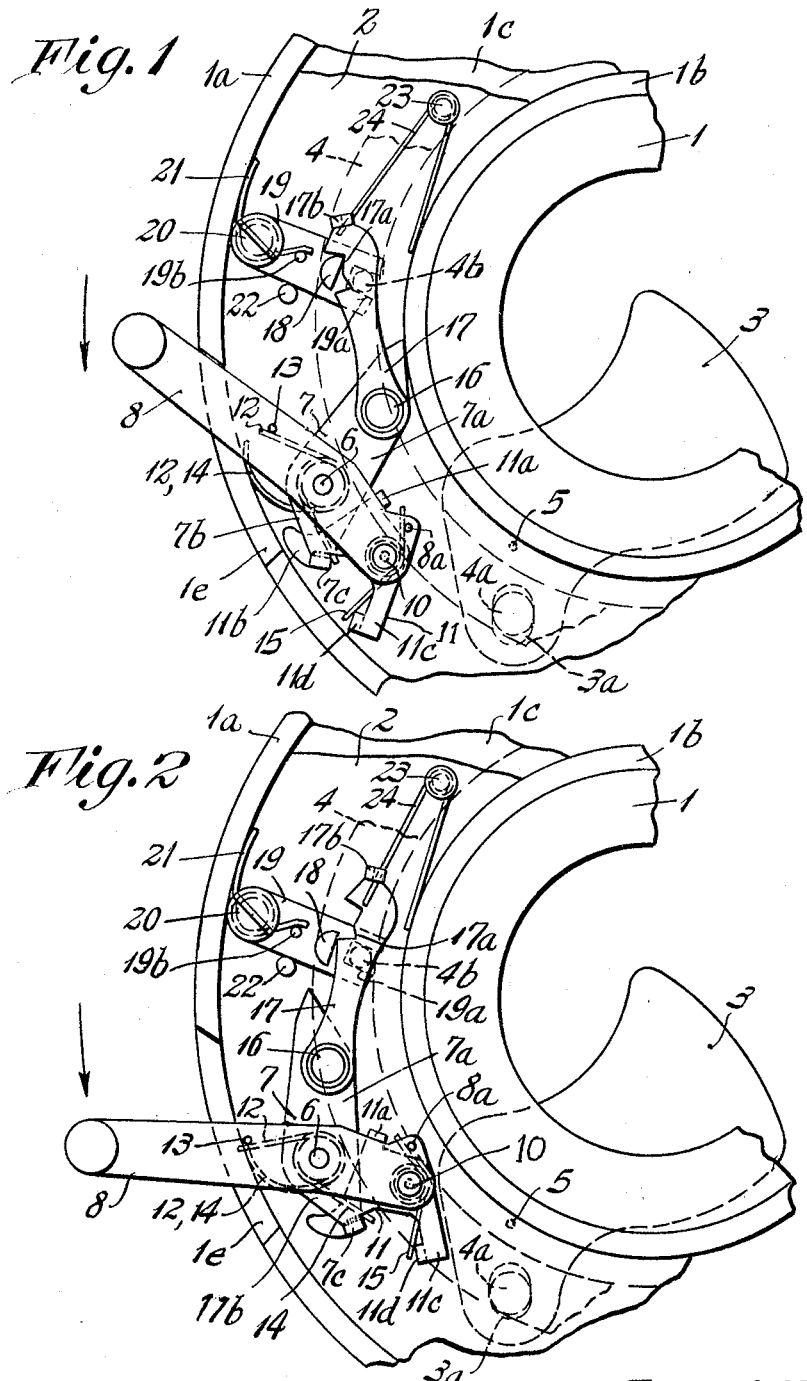
INVENTOR.
Franz W. R. Starp
BY
Arthur A. March
ATTORNEY Sept. 6, 1966  F. W. R. STARP  3,270,649
PHOTOGRAPHIC SELF-COCKING SHUTTER
Filed July 12, 1963  2 Sheets-Sheet 2
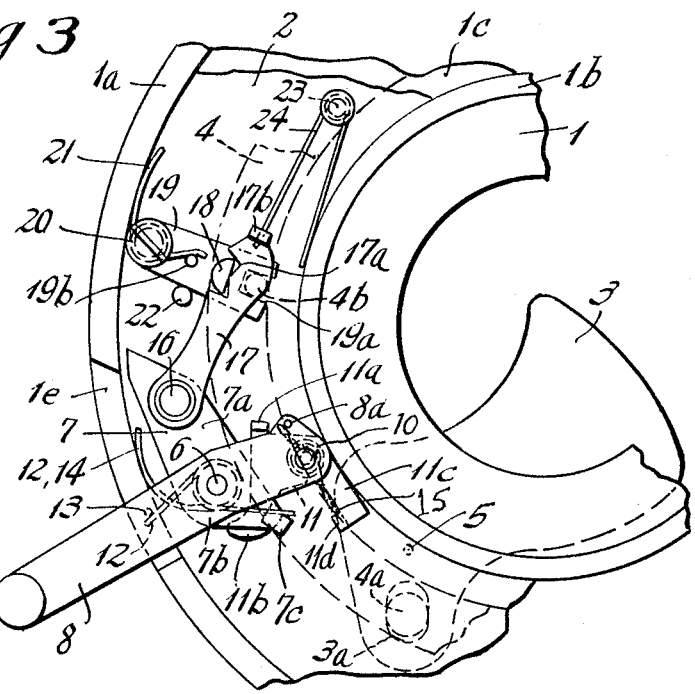
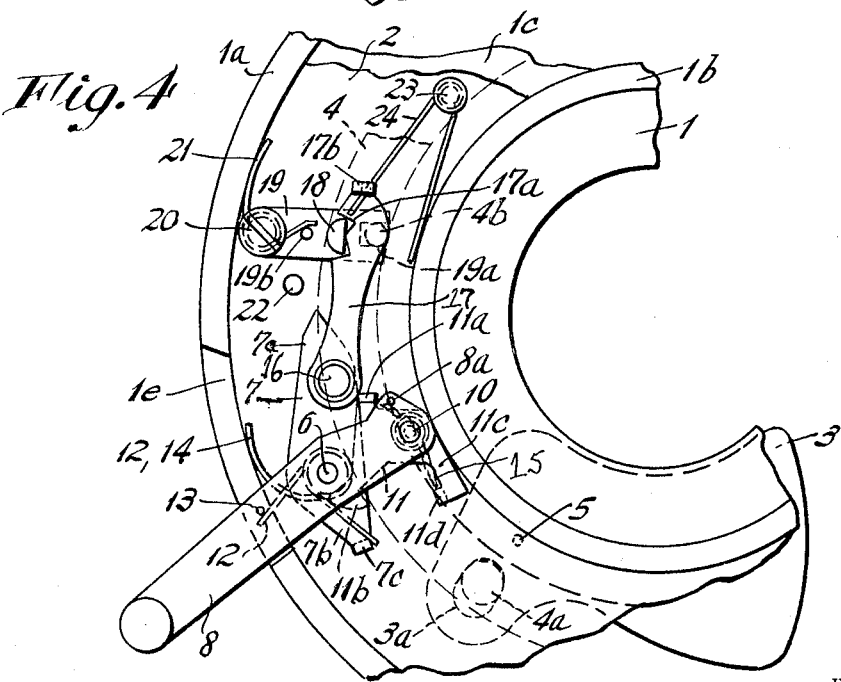
INVENTOR.
Franz. W. R. Starp
BY
Arthur A. March
ATTORNEY

United States Patent Office 3,270,649
Patented Sept. 6, 1966

3,270,649
PHOTOGRAPHIC SELF-COCKING SHUTTER
Franz W. R. Starp, Calmbach (Enz), Germany, assignor to Alfred Gauthier G.m.b.H., Calmbach (Enz), Germany, a corporation of Germany
Filed July 12, 1963, Ser. No. 294,678
Claims priority, application Germany, July 19, 1962, G 35,510
8 Claims. (Cl. 95—63)

This invention relates to a photographic self-cocking shutter having a driving member which may be moved into the cocked position by a cocking and release lever and which cooperates with a shutter blade driving ring by way of a crank member.

In such self-cocking shutters the driving member carrying the crank has heretofore been placed at some distance from the axis of rotation of the cocking and release lever. In order to connect the driving member to the latter it has always been necessary to use several power transmission members, thereby increasing the complexity of the shutter and the space occupied by the shutter mechanism. In addition, the use of such additional members has reduced the efficiency of the driving device and has unnecessarily increased the cocking or release moment of the shutter, in addition to increasing the overall cost.

The present invention overcomes the disadvantages heretofore inherent in self-cocking shutters and results in a simpler mechanism which is both less expensive and more efficient in operation. This is accomplished by pivotally mounting the cocking and release lever and the driving member coaxially with respect to each other and providing a pivotal engagement pawl which operates the driving member while the shutter is being cocked but which automatically releases the driving member at the end of the cocking motion. Thus the shutter is self-cocking and it is still possible to use the well-tried and tested crank drive and shutter blade driving device. The efficiency of the complete mechanism is enhanced because the structure of this invention results is a minimum of frictional resistances within the driving device. Furthermore, the driving device is formed of members which are simple and therefore relatively inexpensive to produce.

In accordance with one form of the invention the driving member is constructed as a two-armed lever one arm of which carries an articulated crank while the other arm is provided with a pin or lug or other suitable means forming a driving connection between the driving member and the engagement pawl operated by the cocking and release lever. This results in a self-cocking shutter that has a minimum of structural members and a high degree of dependability.

Another feature of the invention is that the engagement pawl is provided with an arm that engages a fixed member during the cocking motion of the cocking and release lever so that the pawl automatically releases the driving member at the end of this motion. This leaves the driving member free so that when the cocking and release lever is subsequently operated to make an exposure, the driving member can actuate the shutter blade mechanism. This arrangement has the advantage of forming a simple, inexpensive, and dependable means of releasing the driving member at the end of the cocking motion.

The invention will be further described in the following specification together with the drawings in which:

FIG. 1 is a partial top view of a self-cocking shutter constructed according to the invention and having its front plate removed to show the starting position of the cocking and release lever;

FIG. 2 shows the same shutter as is shown in FIG. 1 at a later stage during the cocking operation;

FIG. 3 shows the shutter of FIG. 1 in the final phase of motion of the cocking and release lever during the cocking operation; and FIG. 4 shows the shutter of FIG. 1 with the cocking and release lever at the end of its motion in which the driving member has been released and whereby the shutter blades have reached their open position.

FIG. 1 shows a photographic self-cocking shutter with a housing which comprises a cylindrical outer wall $1a$ and a cylindrical interior wall $1b$ concentric therewith for holding the lens assembly (not shown). The shutter housing has a base plate 2 which cooperates with an annular disc $1c$ at the bottom of the housing 1 to form an intermediate space or gap within which the shutter blades 3 are rotatably mounted. Only one of these blades is indicated in the drawing for the sake of clarity. The blades are driven by a shutter driving ring 4, which is also located in the space between the annular disc $1c$ and the base plate 2, and are pivotally positioned on individual, fixed pins 5. Each of the blades 3 has a slot $3a$ that engages a pin $4a$ on the driving ring 4 to control the motion of the blades.

A pin 6 is placed in the upper side of the plate 2, and a shutter blade driving member 7 in the form of a two armed lever is pivotally mounted thereon. A cocking and release lever 8 is also pivotally mounted on the same pin 6 to rotate coaxially with the driving member 7 and to cooperate therewith in controlling the operation of the shutter. The outer end of the lever 8 extends through a slot $1e$ in the outer wall $1a$ of the housing 1 so that it may be manipulated in order to cock the shutter mechanism and, later, to release it. On the end of the lever 8 within the housing is a pin 10 on which an engagement pawl 11 is pivotally mounted.

A restoring spring 12 encircles the pin 6 and is positioned so that one end presses against a pin 13 on the lever 8 while the other end presses against the inner surface of the cylindrical wall $1a$ in the proper direction to exert a clockwise rotational force on the lever 8.

The lever 7 has two arms $7a$ and $7b$ the latter of which terminates in a lug $7c$ bent at a right angle to the arm $7b$. A second spring 14 also encircles the pin 6 and is placed so that one of its ends bears against the lug $7c$ while the other end presses on the inner surface of the wall $1a$ to exert a clockwise rotational force on the lever 7.

The engagement pawl 11 is pivotally mounted on the pin 10 to serve as a releasable connection between the driving member 7 and the lever 8. The pawl 11 has a lug $11a$ bent upwardly therefrom to engage the lever 8 and is held in position against the lever 8 by a spring 15, one end of which bears against a pin $8a$ extending from the lever 8 and the other end of which bears against a lug $11d$ that extends from the arm $11c$ of the pawl 11 to establish a driving connection between the member 7 and the lever 8.

The lever arm $7a$ of the driving member has a pivot pin 16 mounted thereon which serves as an axle for a crank 17 to transmit motive force from the lever 8 to the driving ring 4 and to reverse the motion of the driving ring 4. At the free end of the crank is a notch which forms a pair of jaws $17a$ of well-known construction to engage a driving pin 18 mounted on an intermediate lever 19. The lever 19 has two parallel arms, one above the base plate 2 and the other below it, and is pivotally mounted on a shaft 20 located on the base plate 2. The upper arm of the lever 19 carries the driving pin 18 which engages the crank 17 while the end $19a$ of the lower arm is divided to fit around a pin $4b$ of the driving ring 4 to control the movement of the latter in accordance with movement of the lever 19 and the crank 17. A coil spring 21 fits over the pin 20 and bears against a pin $19b$ on the lever and against the cylindrical wall $1a$ of the housing to push the lever 19 in the clockwise direction against fixed stop 22 that extends from the upper side of the base plate 2.

In order to keep the crank 17 in engagement with the driving pin 18 during the movement which takes place as an exposure is being made, which movement is sometimes referred to as the run-down of the shutter, as illustrated in FIGS. 3 and 4, the crank 17 has a lug 17b at its free end. A pin 23 mounted on the base plate 2 holds a spring 24 which engages the lug 17b and the inner cylindrical wall 1b of the shutter housing to press the crank 17 counterclockwise. The intermediate lever 19 may, under certain circumstances, be omitted if the driving pin 18 is placed directly on the driving ring 4. In that case a slotted opening in the base plate 2 is required to permit the pin to extend up into position to be engaged by the jaws 17a of the crank 17. The driving member 17 may also be used to operate a two-sector system.

The operation of the above-described shutter is as follows:

To cock and release the shutter the lever 8 must be pivoted about the shaft 6 in the direction of the arrow shown in FIGS. 1 and 2. This causes the engagement pawl 11 to pivot the driving member 7 about the shaft 6 in the same counterclockwise direction as the lever 8. The crank 17 also moves but does not change the position of the intermediate lever 19 from its starting position because the crank 17 slides inoperatively along the flattened portion of the driving pin 18 during the first phase of motion of the driving member 7 as shown in FIG. 2.

Near the end of this cocking motion of the lever 8 the crank 17 reaches an intermediate position in which the jaws 17a embrace the driving pin 18 under pressure from the spring 24 and the arm 11c of the engagement pawl 11 simultaneously engages the inner cylindrical wall 1b of the shutter housing 1. Continued pivotal movement of the lever 8 during the cocking motion causes a relative rotary motion of the pawl 11 with respect to the lever 8 because the pawl bears against thhe tubular wall 1b. This relative rotary motion finally causes the lug 7c of the driving member 7 to become disengaged from the end 11b of the engagement pawl 11, as illustrated in FIG. 3.

Thereupon the pressure of the main driving spring 14 causes the driving member 7 to enter the second phase of motion and to pivot clockwise about the shaft 6. This pivotal motion of the driving member causes the crank 7 to execute a reciprocating motion that moves the intermediate lever 19, which, in turn, by means of the connection between the lever 19 and the driving ring 4, moves the shutter blades first into the open position, as shown in FIG. 4, and then back into the closed position.

After the lever 8 has been released following the cocking motion, its restoring spring 12 pivots it clockwise into the starting position shown in FIG. 1, whereupon the engagement pawl 11 first turns aside because of the oblique surface of its arresting lug 11b but later, at the end of the motion of the lever 8, automatically hooks onto the lug 7c due to the action of the spring 15, thereby reestablishing the driving connection between the lever 8 and the driving member 7 so that subsequent movement of the lever 8 in the direction of the arrow in FIG. 1 triggers the shutter to make a photographic exposure.

What is claimed is:

1. A photographic self-cocking shutter comprising a cocking and release lever pivotally mounted to pivot about an axis; a driving member pivotally mounted to pivot about the same axis; a pivotally mounted engagement pawl connected to said lever and engaging said driving member to move the same during the cocking movement of said lever, first means engageable with said engagement pawl for automatically releasing said driving member when said lever reaches a predetermined point in its cocking movement; shutter blades and second means connected thereto to move the same between an opened position and a closed position; and a crank connected to said driving member and to said second means to actuate said second means.

2. A photographic self-cocking shutter comprising a cocking and release lever pivotally mounted to pivot about an axis; a driving member pivotally mounted to pivot about the same axis; an engagement pawl pivotally mounted on said lever and engaging said driving member to move the same during the cocking movement of said lever, first means engageable with said engagement pawl for automatically releasing said driving member when said lever reaches a predetermined point in its cocking movement; shutter blades and second means connected thereto to move the same between an opened position and a closed position; and a crank connected to said driving member and to said second means to actuate said second means.

3. A photographic self-cocking shutter comprising a pin; a cocking and release lever pivotally mounted on said pin; a driving member pivotally mounted on said pin; an engagement pawl pivotally mounted on said lever and engaging said driving member to move the same during the cocking movement of said lever, first means engageable with said engagement pawl for automatically releasing said driving member when said lever reaches a predetermined point in its cocking movement; shutter blades and second means connected thereto to move the same between an opened position and a closed position; and a crank pivotally mounted on said driving member to connect said driving member to said second means to actuate said second means.

4. A photographic self-cocking shutter comprising a pin; a cocking and release lever pivotally mounted on said pin; a driving member comprising a two-armed lever pivotally mounted on said pin; an engagement pawl pivotally mounted on said first-named lever and engaging one arm of said two-armed lever to move the driving member during the cocking movement of said first-named lever, first means engageable with said engagement pawl for automatically releasing said driving member when said first-named lever reaches a predetermined point in its cocking movement, shutter blades and second means connected thereto to move the same between an opened position and a closed position; and a crank connected to said driving member and to said second means to actuate said second means.

5. A photographic self-cocking shutter comprising a pin; a cocking and release lever pivotally mounted thereon; a driving member also pivotally mounted on said pin; an engagement pawl pivotally mounted on one end of said lever and engaging said driving member to move the same during the cocking movement of said lever, means engageable with said engagement pawl for automatically releasing said driving member when said lever reaches a predetermined point in its cocking movement; shutter blades; a shutter driving ring connected to said blades to move the same between an opened position and a closed position; and a crank connected to said driving member and to said shutter driving ring to actuate said ring and, thereby, said blades.

6. A photographic self-cocking shutter comprising a fixed housing; a pin extending therefrom; a cocking and release lever pivotally mounted on said pin; a driving member pivotally mounted on said pin; an engagement pawl pivotally mounted on said lever; a spring resiliently biasing said pawl toward engagement with said driving member to move the same during the cocking movement of said lever, said engagement pawl engaging said housing and being pivoted thereby to release said driving member when said lever reaches a predetermined point in its cocking movement; shutter blades and means connected thereto to move the same between an opened position and a closed position; and a crank connected to said driving member and to said means to actuate said means.

7. A photographic self-cocking shutter comprising a pin; a cocking and release lever pivotally mounted on said pin; a driving member in the form of a two-armed lever pivotally mounted on said pin; a lug on one arm of said driving member; an engagement pawl pivotally mounted on said first-named lever and engaging said lug to move said driving member during the cocking movement of said first-named lever, first means engageable with said engagement pawl automatically releasing said driving member when said first-named lever reaches a predetermined point in its cocking movement; shutter blades and second means connected thereto to move the same between an opened position and a closed position; and a crank pivotally mounted on the other arm of said driving member and connected to said second means to actuate said second means.

8. A photographic self-cocking shutter comprising a fixed housing; a pin extending therefrom; a cocking and release lever pivotally mounted on said pin; a driving member in the form of a two-armed lever pivotally mounted on said pin; a lug on one arm of said driving member; an engagement pawl pivotally mounted on one end of said first-named lever and engaging said lug to move said driving member during the cocking movement of said first-named lever, said engagement pawl engaging said housing and being pivoted thereby to release said driving member when said first-named lever reaches a predetermined point in its cocking movement; shutter blades and means connected thereto to move the same between an opened position and a closed position; and a crank pivotally mounted on the other arm of said driving member and connected to said means to actuate said means.

References Cited by the Examiner

UNITED STATES PATENTS

| | | | |
|---|---|---|---|
| 1,354,526 | 10/1920 | Underwood | 95—63 |
| 2,020,036 | 11/1935 | Marks | 95—63 |
| 2,316,020 | 4/1943 | Riddell | 95—63 |
| 2,382,623 | 8/1945 | Fuerst | 96—63 |
| 2,511,201 | 6/1950 | Fuerst | 95—63 |

JOHN M. HORAN, *Primary Examiner.*